(12) United States Patent
Choi et al.

(10) Patent No.: US 12,384,913 B2
(45) Date of Patent: Aug. 12, 2025

(54) THERMOPLASTIC RESIN COMPOSITION AND MOLDED ARTICLE MANUFACTURED USING THE SAME

(71) Applicant: LG CHEM, LTD., Seoul (KR)

(72) Inventors: Eun Jung Choi, Daejeon (KR); Seo Hwa Kim, Daejeon (KR); Byoung Il Kang, Daejeon (KR); Seongkyun Kim, Daejeon (KR); Yeongmin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 770 days.

(21) Appl. No.: 17/774,611

(22) PCT Filed: Jun. 21, 2021

(86) PCT No.: PCT/KR2021/007741
§ 371 (c)(1),
(2) Date: May 5, 2022

(87) PCT Pub. No.: WO2022/085893
PCT Pub. Date: Apr. 28, 2022

(65) Prior Publication Data
US 2022/0380594 A1    Dec. 1, 2022

(30) Foreign Application Priority Data

Oct. 21, 2020 (KR) .................. 10-2020-0136605
Jun. 17, 2021 (KR) .................. 10-2021-0078390

(51) Int. Cl.
| | | |
|---|---|---|
| C08L 55/02 | (2006.01) | |
| C08F 220/18 | (2006.01) | |
| C08L 23/0853 | (2025.01) | |
| C08L 25/12 | (2006.01) | |
| C08L 51/00 | (2006.01) | |
| C08L 77/12 | (2006.01) | |

(52) U.S. Cl.
CPC ........ *C08L 55/02* (2013.01); *C08F 220/1804* (2020.02); *C08F 220/1806* (2020.02); *C08F 220/1808* (2020.02); *C08L 23/0853* (2013.01); *C08L 25/12* (2013.01); *C08L 51/003* (2013.01); *C08L 77/12* (2013.01); *C08L 2203/30* (2013.01); *C08L 2205/025* (2013.01); *C08L 2205/035* (2013.01); *C08L 2207/04* (2013.01); *C08L 2207/53* (2013.01)

(58) Field of Classification Search
CPC .............. C08K 2003/0812; C08K 3/08; C08L 2207/04; C08L 55/02; C08L 51/04; C08L 77/12; C08L 23/0853; C08L 51/003
See application file for complete search history.

(56) References Cited

U.S. PATENT DOCUMENTS

| | | | |
|---|---|---|---|
| 4,877,827 A | 10/1989 | Van Der Groep | |
| 8,691,138 B2 | 4/2014 | Kang et al. | |
| 2007/0203282 A1 | 8/2007 | Bradley et al. | |
| 2012/0129992 A1* | 5/2012 | Kang ................ | C08K 7/00 524/508 |
| 2014/0066561 A1 | 3/2014 | Pfleghar et al. | |
| 2014/0186565 A1 | 7/2014 | Fujisawa et al. | |
| 2018/0171131 A1 | 6/2018 | Park et al. | |
| 2019/0062484 A1 | 2/2019 | Jang et al. | |
| 2019/0194445 A1* | 6/2019 | Shin ................ | C08L 23/08 |
| 2019/0322854 A1* | 10/2019 | Yang ............... | H01B 1/12 |
| 2020/0354561 A1 | 11/2020 | Sim et al. | |
| 2020/0369874 A1 | 11/2020 | Kim et al. | |

FOREIGN PATENT DOCUMENTS

| | | |
|---|---|---|
| CN | 1849366 A | 10/2006 |
| CN | 102498166 A | 6/2012 |
| CN | 103524858 A | 1/2014 |
| CN | 107619526 A | 1/2018 |
| CN | 108779219 A | 11/2018 |
| EP | 0287140 A | 10/1988 |
| EP | 3699228 | 8/2020 |
| JP | 863304039 A | 12/1988 |
| JP | H01165640 A | 6/1989 |
| JP | 103221553 A | 9/1991 |
| JP | H09241475 A | 9/1997 |
| JP | 2005-179445 A | 7/2005 |
| JP | 2006052371 A | 2/2006 |
| JP | 2008-106154 A | 5/2008 |
| JP | 2012-533672 A | 12/2012 |
| JP | 2020503402 A | 1/2020 |

(Continued)

OTHER PUBLICATIONS

Office Action dated Jul. 12, 2024 issued in Taiwanese Patent Application No. 110123963.
Office Action issued in corresponding Japanese Patent Application No. 2022-520109 dated Apr. 24, 2023.
International Search Report and Written Opinion issued in corresponding International Patent Application No. PCT/KR2021/007741 dated Oct. 8, 2021.
Extended European Search Report, dated Nov. 23, 2022, for the corresponding European Patent Application No. 21867915.7, 6 pages.
First Office Action dated Oct. 9, 2023 from the CNIPA corresponding Chinese Patent Application No. 202180005816.1.

*Primary Examiner* — Mark S Kaucher
(74) *Attorney, Agent, or Firm* — Morgan, Lewis & Bockius LLP (57) ABSTRACT

Disclosed is a thermoplastic resin composition having excellent compatibility between a base resin and additives that may prevent aggregation of a metal pigment, and a molded article including the same. Also disclosed is a molded article manufactured using the thermoplastic resin composition, which may reduce flow marks on a metallic surface, and thus appearance and gloss may be excellent, injection quality and antistatic properties may be excellent, and the molded article may be widely used in various fields such as electronics.

20 Claims, 1 Drawing Sheet

(56) References Cited

FOREIGN PATENT DOCUMENTS

| | | |
|---|---|---|
| KR | 10-2009-0072829 A | 7/2009 |
| KR | 10-2011-0008598 A | 1/2011 |
| KR | 10-2013-0046154 A | 5/2013 |
| KR | 10-2013-0134470 A | 12/2013 |
| KR | 10-2014-0027473 A | 3/2014 |
| KR | 10-2017-0005288 A1 | 1/2017 |
| KR | 10-2018-0066812 A | 6/2018 |
| KR | 10-2018-0071835 A | 6/2018 |
| KR | 10-2019-0051560 A | 5/2019 |
| KR | 10-2019-0066391 A | 6/2019 |
| KR | 10-2005162 B1 | 8/2019 |
| KR | 10-2020-0049381 A | 5/2020 |
| TW | 201422696 A | 6/2014 |
| WO | 2019/078464 A1 | 4/2019 |

\* cited by examiner

THERMOPLASTIC RESIN COMPOSITION AND MOLDED ARTICLE MANUFACTURED USING THE SAME

TECHNICAL FIELD

Cross-Reference to Related Applications

The present application is a U.S. National Stage of PCT/KR2021/007741, filed on Jun. 21, 2021, which claims priority to Korean Patent Application No. 10-2020-0136605, filed on Oct. 21, 2020, and Korean Patent Application No. 10-2021-0078390, re-filed on Jun. 17, 2021, based on the priority of the above patent, in the Korean Intellectual Property Office, the disclosures of each of which are incorporated herein by reference.

The present invention relates to a thermoplastic resin composition and a molded article manufactured using the same, and more particularly, to a thermoplastic resin composition having excellent surface resistance, appearance, gloss, and processability when molding in the presence of an antistatic agent and a metal pigment and a molded article manufactured using the thermoplastic resin composition.

BACKGROUND ART

Recently, as demand for differentiated products and products with new designs increases, diversification is attempted in terms of colors and designs. Change in design is related to change in materials, and research and development of products having a metal-like surface are also being actively conducted.

To impart a metallic feel to the surface of a product, the surface of a product was made of a metal, or a method of applying a metallic paint on the surface of a product was used. However, when a metal is used, there are problems in that the weight and production cost of a product increase and surface processing is not easy. In addition, when a metallic paint is applied to the surface of a product, there is a problem in that harmful components may be generated from the paint applied to the surface.

Accordingly, recently, a method of directly introducing a metal pigment to a vinyl cyanide compound-conjugated diene rubber-aromatic vinyl compound graft copolymer (hereinafter referred to as "ABS-based resin") represented by an acrylonitrile-butadiene-styrene (hereinafter referred to as "ABS") resin having good processability and excellent impact strength and appearance and molding the resin into a product has been used. In this case, an antistatic agent must be included to improve antistatic properties. As such, when the antistatic agent is included, there is a disadvantage in that surface defects are increased. Thus, technology for preparing an ABS resin capable of providing excellent antistatic properties and product quality such as surface quality while maintaining the excellent processability, moldability, impact resistance, strength, and gloss of an ABS-based resin needs to be developed.

RELATED ART DOCUMENTS

Patent Documents

KR 2013-0046154 A

DISCLOSURE

Technical Problem

Therefore, the present invention has been made in view of the above problems, and it is one object of the present invention to provide a thermoplastic resin composition having excellent antistatic properties, injection quality, and appearance.

It is another object of the present invention to provide a molded article having a metallic color manufactured using the thermoplastic resin composition.

The above and other objects can be accomplished by the present invention described below.

Technical Solution

In accordance with one aspect of the present invention, provided is a thermoplastic resin composition including:
   a base resin including a first graft copolymer including a conjugated diene-based polymer, an aromatic vinyl-based monomer, and a vinyl cyanide-based monomer; a second graft copolymer including an acrylic rubber-based polymer, an aromatic vinyl-based monomer, and a vinyl cyanide-based monomer; and a thermoplastic copolymer including an aromatic vinyl-based monomer and a vinyl cyanide-based monomer,
   a thermoplastic polyamide elastomer,
   an ethylene copolymer, and
   a metal pigment,
   wherein, when a weight of the thermoplastic polyamide elastomer based on 100 parts by weight of the base resin is "a", a weight of the ethylene copolymer based on 100 parts by weight of the base resin is "b", and a weight of the second graft copolymer based on 100% by weight in total of the base resin is "c", b+c≥0.5a is satisfied.

A weight ratio of the first graft copolymer to the second graft copolymer may be 3:1 to 5:1.

The base resin may include 15 to 40% by weight of the first graft copolymer; 3 to 17% by weight of the second graft copolymer; and 55 to 80% by weight of the thermoplastic copolymer.

The ethylene copolymer may include one or more selected from an ethylene vinyl acetate copolymer, an ethylene butyl acrylate copolymer, an ethylene methyl acrylate copolymer, an ethylene ethyl acrylate copolymer, an ethylene methyl methacrylate copolymer, an ethylene butene copolymer, and an ethylene octene copolymer.

Based on 100 parts by weight of the base resin, the ethylene copolymer may be included in an amount of 1 to 6 parts by weight.

Based on 100% by weight in total of the ethylene copolymer, the ethylene copolymer may include 18 to 30% by weight of vinyl acetate.

The thermoplastic polyamide elastomer may have a surface resistance of $1\times10^7$ to $1\times10^9$ Ω/sq as measured according to IEC 60093.

Based on 100 parts by weight of the base resin, the thermoplastic polyamide elastomer may include 5 to 20 parts by weight of one or more selected from a poly(ether-block-amide) copolymer and a poly(ether ester-block-amide) copolymer.

Based on 100 parts by weight of the base resin, the metal pigment may include 0.05 to 5 parts by weight of one or more selected from an aluminum pigment, a copper pigment, and a silver pigment.

In the first graft copolymer, the conjugated diene-based rubber may have an average particle diameter of 0.01 to 1 μm, and a shell may have a weight average molecular weight of 70,000 to 300,000 g/mol.

Based on 100% by weight in total of the first graft copolymer, the first graft copolymer may include 40 to 80% by weight of the conjugated diene-based polymer, 10 to 45% by weight of the aromatic vinyl-based monomer, and 1 to 25% by weight of the vinyl cyanide-based monomer.

In the second graft copolymer, acrylic rubber may have an average particle diameter of 0.01 to 1 μm, and a shell may have a weight average molecular weight of 70,000 to 300,000 g/mol.

Based on 100% by weight in total of the second graft copolymer, the second graft copolymer may include 40 to 70% by weight of the acrylic rubber-based polymer, 10 to 45% by weight of the aromatic vinyl-based monomer, and 1 to 25% by weight of the vinyl cyanide-based monomer.

The acrylic rubber-based polymer may include one or more selected from a butyl (meth)acrylate polymer, a 2-ethylhexyl (meth)acrylate polymer, and a hexyl acrylate polymer.

Based on 100% by weight in total of the thermoplastic copolymer, the thermoplastic copolymer may include 50 to 90% by weight of the aromatic vinyl-based monomer and 10 to 50% by weight of the vinyl cyanide-based monomer.

The thermoplastic copolymer may include two or more types of thermoplastic copolymers having different vinyl cyanide-based monomer contents.

The thermoplastic resin composition may be a permanent antistatic thermoplastic resin composition.

In accordance with another aspect of the present invention, provided is a method of preparing a thermoplastic resin composition, the method including:

melt-kneading and extruding a thermoplastic resin composition including a base resin including a first graft copolymer including a conjugated diene-based polymer, an aromatic vinyl-based monomer, and a vinyl cyanide-based monomer; a second graft copolymer including an acrylic rubber-based polymer, an aromatic vinyl-based monomer, and a vinyl cyanide-based monomer; and a thermoplastic copolymer including an aromatic vinyl-based monomer and a vinyl cyanide-based monomer, a thermoplastic polyamide elastomer, an ethylene copolymer, and a metal pigment, wherein, when a weight of the thermoplastic polyamide elastomer based on 100 parts by weight of the base resin is "a", a weight of the ethylene copolymer based on 100 parts by weight of the base resin is "b", and a weight of the second graft copolymer based on 100% by weight in total of the base resin is "c", b+c≥0.5a is satisfied.

In accordance with yet another aspect of the present invention, provided is a molded article manufactured using the above-described thermoplastic resin composition.

The molded article may have a surface resistance of $1×10^{12}$ Ω/sq or less as measured according to IEC 60093 and a gloss (45°) of 100 or more as measured according to ASTM E97.

Advantageous Effects

In the case of a thermoplastic resin composition according to the present invention, compatibility between a styrene-based resin as a base resin and additives is excellent. Thus, aggregation of a metal pigment can be prevented.

That is, in a molded article manufactured using the thermoplastic resin composition according to the present invention, flow marks on a metallic surface can be reduced. Accordingly, the molded article according to the present invention has excellent appearance, gloss, injection quality, and antistatic properties, and thus can be applied to various fields such as electronics and home appliances.

BEST MODE

Hereinafter, the present invention will be described in more detail to aid in understanding of the present invention.

The terms and words which are used in the present specification and the appended claims should not be construed as being confined to common meanings or dictionary meanings but should be construed as having meanings and concepts matching the technical spirit of the present invention in order to describe the present invention in the best fashion.

In this description, a polymer including a certain compound means a polymer prepared by polymerizing the compound, and a unit in the polymer is derived from the compound.

In this description, surface resistance is a variable indicating antistatic properties, and may be measured in various ways known in the art. Unless otherwise specified, surface resistance refers to a value (unit: Ω/sq) measured according to IEC 60093.

When a material has a surface resistance of $1×10^{12}$ Ω/sq or less, it may be judged that the material has a permanent antistatic effect.

In this description, average particle diameter may be measured by dynamic light scattering. Specifically, the average particle diameter of a specimen in latex form may be measured in a Gaussian mode using a particle size distribution analyzer (Nicomp 380). In a particle size distribution measured by dynamic light scattering, an arithmetic average particle diameter may mean a scattering intensity average particle diameter.

As a specific measurement example, a sample is prepared by diluting 0.1 g of latex (TSC: 35 to 50 wt %) 1,000 to 5,000-fold with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

In this description, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specifically, the weight average molecular weight is a weight average molecular weight (Mw) converted based on polystyrene by gel permeation chromatography (GPC, PL GPC220, Agilent Technologies).

Specifically, a polymer to be measured is dissolved in tetrahydrofuran to a concentration of 1%, and 10 μl of the dissolved sample is injected into a gel permeation chromatograph (GPC) at a flow rate of 0.3 mL/min. At this time, analysis is performed at a sample concentration of 2.0 mg/mL (100 µl injection) at 30° C. In this case, two columns (PLmixed B, Waters Co.) are connected in series, and an RI detector (2414, Agilent Waters Co.) is used. At this time, measurement is performed at 40° C., and data is processed using ChemStation.

In this description, the composition ratio of a (co)polymer may mean the content of units constituting the (co)polymer, or may mean the content of units input during polymerization of the (co)polymer.

In this description, "content" means weight unless otherwise defined.

In this description, the "derivatives" of a compound may mean compounds in which one or more hydrogens or functional groups of the compound are substituted with a substituent such as an akyl group and a halogen group.

In this description, when grafting degree is measured, acetone is added to 1 g of dried graft polymer powder, followed by stirring for 24 hours at room temperature. Then, centrifugation is performed to separate insoluble matter that is not dissolved in acetone, followed by drying. Then, the weight of the insoluble matter is measured. The measured value is substituted into Equation 1 below to calculate a grafting degree.

Grafting degree (%)=[Weight of grafted monomers (g)/Rubber weight (g)]×100　　　　　[Equation 1]

Weight of grafted monomers (g): A graft copolymer is immersed in acetone, vibrated with a vibrator (trade name: SI-600R, manufacturer: Lab Companion) for 24 hours to dissolve the isolated graft copolymer, centrifuged at 14,000 rpm for 1 hour using a centrifuge, and dried at 140° C. for 2 hours using a vacuum dryer (trade name: DRV320DB, manufacturer: ADVANTEC) to obtain insoluble substances (gel). Then, the weight of grafted monomers is obtained by subtracting rubber weight (g) from the weight of the insoluble substances Rubber weight (g): Weight of a theoretically added rubber core in graft copolymer powder The present inventors confirmed that, when a material containing an antistatic agent for imparting antistatic properties to a styrene-based resin having good processability and excellent impact strength and appearance was molded to produce a product having a metallic color, when a second graft copolymer and an ethylene copolymer according to the present invention were used separately, surface properties were poor due to easy aggregation of a metal pigment. However, the second graft copolymer and the ethylene copolymer were used in an appropriate mixing ratio based on the content of the antistatic agent, the excellent processability, moldability, impact resistance, strength, and gloss of the styrene-based resin were maintained, and compatibility between the styrene-based resin and the metal pigment and compatibility between the styrene-based resin and the antistatic agent were excellent. Thus, the present inventors could provide a material capable of preventing aggregation of the metal pigment and having excellent antistatic properties and surface properties and good basic physical properties. Based on these results, the present inventors conducted further studies to complete the present invention.

The thermoplastic resin composition of the present invention includes a base resin including a first graft copolymer, a second graft copolymer, and a thermoplastic copolymer, a metal pigment, an ethylene copolymer, and a thermoplastic polyamide elastomer.

The thermoplastic resin composition of the present invention includes the components. In this case, when the weight of the thermoplastic polyamide elastomer based on 100 parts by weight of the base resin is "a", the weight of the ethylene copolymer based on 100 parts by weight of the base resin is "b", and the weight of the second graft copolymer based on 100% by weight in total of the base resin is "c", $b+c \geq 0.5a$ may be satisfied. In this case, a molded article having desired effects such as antistatic properties, appearance, injection quality, gloss, and processability may be provided.

In addition, the present invention may provide a permanent antistatic thermoplastic resin composition.

Hereinafter, each component constituting the thermoplastic resin composition of the present invention will be described in detail as follows.

Base Resin

When considering mechanical properties such as processability and impact strength, maintenance of appearance, antistatic properties, and the molding properties of materials to be introduced, the base resin preferably includes a first graft copolymer; a second graft copolymer; and a thermoplastic copolymer.

First Graft Copolymer

The first graft copolymer of the present invention includes a conjugated diene-based polymer, an aromatic vinyl-based monomer, and a vinyl cyanide-based monomer.

The first graft copolymer may impart excellent processability to a thermoplastic resin composition, and may serve as an impact modifier in a molded article manufactured using the thermoplastic resin composition.

The conjugated diene-based polymer may include a modified conjugated diene-based polymer prepared by graft-polymerizing an aromatic vinyl-based monomer and a vinyl cyanide-based monomer onto a conjugated diene-based polymer prepared by polymerizing a conjugated diene-based monomer. In this case, the conjugated diene-based polymer may be a conjugated diene rubber polymer.

For example, the conjugated diene rubber polymer may be a latex in which conjugated diene rubber in a colloidal state is dispersed in water (however, weight is based on solids). In this case, mechanical strength and processability may be excellent.

The conjugated diene rubber polymer refers to a (co) polymer prepared by polymerizing a conjugated diene compound having a structure in which a double bond and a single bond are arranged alternately. For example, the conjugated diene rubber polymer may be selected from a butadiene polymer, a butadiene-styrene copolymer, and a butadiene-acrylonitrile copolymer.

In addition, for example, the conjugated diene-based monomer may include one or more selected from 1,3-butadiene, isoprene, chloroprene, and piperylene, preferably 1,3-butadiene.

For example, the conjugated diene-based polymer may have an average particle diameter of 0.01 to 1 µm, preferably 0.03 to 0.8 µm, more preferably 0.05 to 0.5 µm. Within this range, the impact strength, processability, surface properties, and surface gloss of a molded article manufactured using the thermoplastic resin composition of the present invention may be further improved.

For example, based on 100% by weight in total of the first graft copolymer, the conjugated diene-based polymer may be included in an amount of 40 to 80% by weight, preferably 45 to 75% by weight, more preferably 50 to 70% by weight. Within this range, the impact strength, processability, surface properties, and surface gloss of a molded article manufactured using the thermoplastic resin composition of the present invention may be further improved.

For example, the shell of the copolymer may have a weight average molecular weight of 70,000 to 300,000 g/mol, preferably 80,000 to 170,000 g/mol, more preferably 90,000 to 150,000 g/mol. Within this range, mechanical properties may be improved.

The shell of the copolymer may include an aromatic vinyl-based monomer and a vinyl cyanide-based monomer graft-polymerized onto a conjugated diene-based polymer.

For example, the aromatic vinyl-based monomer may include one or more selected from styrene, α-methylstyrene, β-methylstyrene, α-ethylstyrene, β-ethylstyrene, vinyltoluene, and derivatives thereof, preferably styrene.

For example, based on 100% by weight in total of the first graft copolymer, the aromatic vinyl-based monomer may be included in an amount of 10 to 45% by weight, preferably 20 to 40% by weight, more preferably 20 to 30% by weight, most preferably 25 to 30% by weight. Within this range, the mechanical properties of a molded article manufactured using the thermoplastic resin composition of the present invention may be further improved.

For example, the vinyl cyanide-based monomer may include one or more selected from acrylonitrile, methacrylonitrile, ethacrylonitrile, phenylacrylonitrile, α-chloroacrylonitrile, and derivatives thereof, preferably acrylonitrile.

For example, based on 100% by weight in total of the first graft copolymer, the vinyl cyanide-based monomer may be included in an amount of 1 to 25% by weight, preferably 5 to 19% by weight, more preferably 7 to 15% by weight. Within this range, the mechanical properties of a molded article manufactured using the thermoplastic resin composition of the present invention may be further improved.

The copolymer may be prepared by polymerizing an aromatic vinyl-based monomer and a vinyl cyanide-based monomer in the presence of a conjugated diene-based polymer using one or more methods selected emulsion polymerization, suspension polymerization, and bulk polymerization, preferably emulsion polymerization.

The emulsion polymerization may be graft emulsion polymerization. For example, the emulsion polymerization may be performed at 50 to 90° C., preferably 60 to 85° C.

The emulsion polymerization may be performed in the presence of an initiator and an emulsifier.

The initiator may be a radical initiator. As a specific example, the initiator may include one or more selected from inorganic peroxides including sodium persulfate, potassium persulfate, ammonium persulfate, potassium superphosphate, and hydrogen peroxide; organic peroxides including t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butylperoxy isobutyrate; and azo compounds including azobis isobutyronitrile, azobis-2,4-dimethylvaleronitrile, azobis(cyclohexanecarbonylnitrile), and azobis isobutyric acid methyl.

In addition to the initiator, an activator may be further introduced to promote initiation reaction.

For example, the activator may include one or more selected from sodium formaldehyde sulfoxylate, sodium ethylenediamine tetraacetate, ferrous sulfate, dextrose, sodium pyrophosphate, anhydrous sodium pyrophosphate, and sodium sulfate.

For example, based on 100 parts by weight in total of monomers (including a conjugated diene-based polymer) constituting the copolymer, the initiator may be included in an amount of 0.001 to 1 part by weight, preferably 0.01 to 0.5 parts by weight, more preferably 0.02 to 0.1 parts by weight. Within this range, emulsion polymerization may be easily performed, and the residual amount of an initiator in the copolymer may be minimized to an amount of several tens of ppm.

For example, the emulsifier may include one or more selected from a potassium compound of alkylbenzene sulfonate, a sodium compound of alkylbenzene sulfonate, a potassium compound of alkyl carboxylate, a sodium compound of alkyl carboxylate, a potassium compound of oleic acid, a sodium compound of oleic acid, a potassium compound of alkyl sulfate, a sodium compound of alkyl sulfate, a potassium compound of alkyl dicarboxylate, a sodium compound of alkyl dicarboxylate, a potassium compound of alkyl ether sulfonate, a sodium compound of alkyl ether sulfonate, and an ammonium compound of allyloxynonylphenoxypropane-2-yloxy methylsulfonate, preferably sodium dodecylbenzenesulfonate.

Commercially available emulsifiers may be used as the emulsifier. For example, one or more selected from SE10N, BC-10, BC-20, HS10, Hitenol KH10, and PD-104 may be used as the emulsifier.

For example, based on 100 parts by weight in total of monomers (including a conjugated diene-based polymer) constituting the copolymer, the emulsifier may be included in an amount of 0.15 to 2.0 parts by weight, preferably 0.3 to 1.5 parts by weight, more preferably 0.5 to 1.2 parts by weight. Within this range, emulsion polymerization may be easily performed, and the residual amount of an initiator in the copolymer may be minimized to an amount of several tens of ppm.

When performing the emulsion polymerization, a molecular weight modifier may be further introduced. For example, the molecular weight modifier may include one or more selected from t-dodecyl mercaptan, n-dodecyl mercaptan, and an alpha-methylstyrene dimer, preferably t-dodecyl mercaptan.

For example, based on 100 parts by weight in total of monomers (including a conjugated diene-based polymer) constituting the copolymer, the molecular weight modifier may be included in an amount of 0.1 to 1 part by weight, preferably 0.2 to 0.8 parts by weight, more preferably 0.4 to 0.6 parts by weight.

The emulsion polymerization may be initiated after monomers and the like are fed into a reactor batchwise. Alternatively, some of monomers and the like may be fed into a reactor before start of emulsion polymerization, and the remainder may be continuously fed into the reactor after start of emulsion polymerization, or emulsion polymerization may be performed while continuously feeding monomers and the like for a certain period of time.

The obtained first graft copolymer may be in the form of latex, and may be recovered in a dried power form through aggregation, dehydration, and drying processes.

As a coagulant used for aggregation, salts such as calcium chloride, magnesium sulfate, and aluminum sulfate, acidic substances such as sulfuric acid, nitric acid, and hydrochloric acid, and mixtures thereof may be used.

For example, based on 100% by weight in total of the base resin, the first graft copolymer may be included in an amount of 15 to 40% by weight, preferably 17 to 35% by weight, more preferably 20 to 30% by weight. Within this range, a molded article manufactured by injecting the thermoplastic resin composition of the present invention may have excellent mechanical properties and injection quality.

Second Graft Copolymer

The thermoplastic resin composition of the present invention includes a second graft copolymer. For example, the second graft copolymer includes an acrylic rubber-based polymer, an aromatic vinyl-based monomer, and a vinyl cyanide-based monomer.

The second graft copolymer may impart excellent impact resistance and rigidity to a thermoplastic resin composition. In particular, the second graft copolymer may increase compatibility between the above-described first graft copolymer and a metal pigment and a thermoplastic polyamide elastomer to be described later, thereby improving the appearance of a molded article manufactured by injecting the thermoplastic resin composition of the present invention.

The second graft copolymer may have a structure consisting of a seed, a core, and a shell.

The seed may include an acrylic rubber-based polymer prepared by polymerizing an alkyl(meth)acrylate-based monomer alone or polymerizing an alkyl(meth)acrylate-based monomer and an aromatic vinyl-based monomer.

The core may be formed to surround the seed, and may be prepared by polymerizing an alkyl(meth)acrylate-based monomer.

For example, the alkyl(meth)acrylate-based monomer included in the seed and the core may include one or more selected from methyl(meth)acrylate, ethyl(meth)acrylate, propyl(meth)acrylate, butyl(meth)acrylate, 2-ethylhexyl (meth)acrylate, hexylacrylate, decyl(meth)acrylate, and lauryl(meth)acrylate, preferably a butyl(meth)acrylate monomer, a 2-ethylhexyl(meth)acrylate monomer, or a hexylacrylate monomer.

The shell may be formed to surround the core, and may be prepared by polymerizing one or more selected from an aromatic vinyl-based monomer and a vinyl cyanide-based monomer.

When the second graft copolymer is prepared, one or more methods selected from emulsion polymerization, suspension polymerization, and bulk polymerization may be used. Thereamong, emulsion polymerization is preferably used.

When the seed of the second graft copolymer is prepared, an alkyl (meth)acrylate-based monomer may be fed batchwise or continuously, and then emulsion polymerization may be performed. Alternatively, an alkyl (meth)acrylate-based monomer and an aromatic vinyl-based monomer may be fed batchwise or continuously, and then emulsion polymerization may be performed.

When the core of the second graft copolymer is prepared, an alkyl (meth)acrylate-based monomer may be fed in the presence of the seed batchwise or continuously, and then emulsion polymerization may be performed.

When the shell of the second graft copolymer is prepared, one or more selected from the group consisting of an aromatic vinyl-based monomer and a vinyl cyanide-based monomer may be fed in the presence of the core batchwise or continuously, and then emulsion polymerization may be performed.

For example, based on 100% by weight in total of the second graft copolymer, the acrylic rubber-based polymer in the second graft copolymer may be included in an amount of 40 to 70% by weight, preferably 45 to 65% by weight, more preferably 45 to 60% by weight. Within this range, a molded article manufactured using the thermoplastic resin composition of the present invention may have excellent impact strength, thermal stability, and surface quality such as surface gloss.

For example, the acrylic rubber-based polymer may have an average particle diameter of 0.01 to 1 µm, preferably 0.03 to 0.8 µm, more preferably 0.05 to 0.6 µm. Within this range, the mechanical properties, gloss, and processability of a molded article manufactured using the thermoplastic resin composition of the present invention may be further improved.

For example, the shell of the copolymer may have a weight average molecular weight of 70,000 to 300,000 g/mol, preferably 80,000 to 170,000 g/mol, more preferably 90,000 to 150,000 g/mol. Within this range, mechanical properties may be improved.

The aromatic vinyl-based monomer is the same as that described in the first graft copolymer.

For example, based on 100% by weight in total of the second graft copolymer, the aromatic vinyl-based monomer may be included in an amount of 10 to 45% by weight, preferably 20 to 40% by weight, more preferably 20 to 30% by weight, most preferably 25 to 30% by weight. Within this range, the rigidity and processability of a copolymer may be further improved, and the mechanical properties of a thermoplastic resin composition may be further improved.

The vinyl cyanide-based monomer is the same as that described in the first graft copolymer.

For example, based on 100% by weight in total of the second graft copolymer, the vinyl cyanide-based monomer may be included in an amount of 1 to 25% by weight, preferably 2 to 20% by weight, more preferably 4 to 17% by weight. Within this range, the rigidity and impact resistance of a copolymer may be further improved, and the mechanical properties of a thermoplastic resin composition may be further improved.

For example, based on 100% by weight in total of the base resin, the second graft copolymer may be included in an amount of 3 to 17% by weight, preferably 5 to 15% by weight, more preferably 5 to 10% by weight. Within this range, a molded article manufactured by injecting the thermoplastic resin composition of the present invention may have excellent mechanical properties and injection quality.

The weight ratio of the first graft copolymer to the second graft copolymer may be 3:1 to 5:1. Within this range, a molded article manufactured by injecting the thermoplastic resin composition of the present invention may have excellent mechanical properties and injection quality.

Thermoplastic Copolymer

A thermoplastic copolymer of the present invention includes an aromatic vinyl-based monomer and a vinyl cyanide-based monomer.

The thermoplastic copolymer may be included to serve as a base resin for controlling the balance of physical properties of the thermoplastic resin composition, i.e., mechanical properties, such as surface impact resistance, processability, coating appearance, and prevention of cracking after coating.

The thermoplastic copolymer may be prepared by copolymerizing an aromatic vinyl-based monomer and a vinyl cyanide-based monomer.

Specifically, when the thermoplastic copolymer is prepared, an aromatic vinyl-based monomer and a vinyl cyanide-based monomer may be fed batchwise or continuously, and then one or more methods selected from emulsion polymerization, suspension polymerization, and bulk polymerization may be performed.

The aromatic vinyl-based monomer and the vinyl cyanide-based monomer are the same as those described in the first graft copolymer.

For example, based on 100% by weight in total of the thermoplastic copolymer, the thermoplastic copolymer may include the aromatic vinyl-based monomer in an amount of 50 to 90% by weight, preferably 55 to 85% by weight, more preferably 60 to 80% by weight, most preferably 65 to 76% by weight. Within this range, the physical property balance and surface gloss of a molded article manufactured using the thermoplastic resin composition of the present invention may be further improved.

For example, based on 100% by weight in total of the thermoplastic copolymer, the thermoplastic copolymer may include the vinyl cyanide-based monomer in an amount of 10 to % by weight, preferably 15 to 45% by weight, more preferably 20 to 40% by weight, most preferably 24 to 35% by weight. Within this range, the physical property balance and surface gloss of a molded article manufactured using the thermoplastic resin composition of the present invention may be further improved.

For example, the thermoplastic copolymer may have a weight average molecular weight of 40,000 to 200,000 g/mol, preferably 60,000 to 190,000 g/mol, more preferably 80,000 to 190,000 g/mol. Within this range, the physical property balance, i.e., the balance of mechanical properties, processability, and coating appearance, of a base resin may be easily controlled.

As the thermoplastic copolymer, a commercially available thermoplastic copolymer may be used as long as the thermoplastic copolymer follows the definition of the present invention.

For example, based on 100% by weight in total of the base resin, the thermoplastic copolymer may be included in an amount of 55 to 80% by weight, preferably 60 to 80% by weight, more preferably 65 to 80% by weight, most preferably to 75% by weight. Within this range, the physical property balance and surface gloss of a molded article manufactured using the thermoplastic resin composition of the present invention may be further improved.

The thermoplastic copolymer preferably includes two or more types of thermoplastic copolymers having different vinyl cyanide-based monomer contents.

That is, the thermoplastic copolymer may include a first copolymer in which a vinyl cyanide-based monomer has a first content and a second copolymer in which a vinyl cyanide-based monomer has a second content greater than the first content.

For example, in the first copolymer, the vinyl cyanide-based monomer may have a content of 21 to 31% by weight (corresponding to the first content). In the second copolymer, the vinyl cyanide-based monomer may have a content of greater than 31% by weight and 35% by weight or less (corresponding to the second content). Within this range, the mechanical properties, injection quality, and processability of a molded article manufactured by injecting the thermoplastic resin composition of the present invention may be further improved.

The thermoplastic copolymer may be prepared by polymerizing an aromatic vinyl-based monomer and a vinyl cyanide-based monomer using one or more methods selected from bulk polymerization, emulsion polymerization, and suspension polymerization. Thereamong, the thermoplastic copolymer is preferably prepared using bulk polymerization. In this case, manufacturing cost may be reduced, and mechanical properties may be excellent.

In the case of bulk polymerization, since additives such as emulsifiers or suspending agents are not added, a high-purity copolymer in which the amount of impurities in the copolymer is minimized may be prepared. Accordingly, it may be advantageous to include a copolymer prepared by bulk polymerization in a thermoplastic resin composition for maintaining transparency.

For example, the bulk polymerization may be performed by adding an organic solvent as a reaction medium and, when necessary, additives such as a molecular weight modifier and a polymerization initiator to a monomer mixture.

As a specific example, a method of preparing the thermoplastic copolymer may include a step of mixing 100 parts by weight of a monomer mixture containing an aromatic vinyl-based compound and a vinyl cyanide-based compound, 20 to 40 parts by weight of a reaction medium, and 0.05 to 0.5 parts by weight of a molecular weight modifier and performing polymerization reaction at a reaction temperature of 130 to 170° C. for 2 to 4 hours.

As the reaction medium, solvents commonly used in the art may be used without particular limitation. For example, aromatic hydrocarbon-based compounds such as ethylbenzene, benzene, toluene, and xylene may be used as the reaction medium.

For example, the method of preparing the thermoplastic copolymer may be performed using a continuous processing machine consisting of a raw material input pump, a continuous stirring tank into which reaction raw materials are continuously fed, a pre-heating tank for pre-heating a polymer solution discharged from the continuous stirring tank, a volatilization tank for volatilizing unreacted monomers and/or a reaction medium, a polymer transfer pump, and an extruder for preparing a polymer in the form of pellets.

At this time, the extrusion processing conditions may be 210 to 240° C., but the present invention is not limited thereto.

As the thermoplastic copolymer, a commercially available thermoplastic copolymer may be used as long as the thermoplastic copolymer follows the definition of the present invention.

For example, based on 100% by weight in total of the base resin, the thermoplastic copolymer may be included in an amount of 55 to 80% by weight, preferably 60 to 80% by weight, more preferably 65 to 75% by weight. Within this range, the physical property balance, i.e., the balance of mechanical properties, processability, and coating appearance, of a base resin may be easily controlled.

Thermoplastic Polyamide Elastomer

In this description, the thermoplastic polyamide elastomer serves as an antistatic agent.

For example, the thermoplastic polyamide elastomer may have a surface resistance of $1 \times 10^{\wedge}7$ to $1 \times 10^{\wedge}9$ Ω/sq as measured according to IEC 60093.

For example, the thermoplastic polyamide elastomer may include one or more selected from a poly(ether-block-amide) copolymer and a poly(ether ester-block-amide) copolymer.

For example, based on 100 parts by weight of the base resin (the first graft copolymer+the second graft copolymer+the thermoplastic copolymer), the thermoplastic polyamide elastomer may be included in an amount of 5 to 20 parts by weight, preferably 6 to 19 parts by weight, most preferably 8 to 17 parts by weight. When the thermoplastic polyamide elastomer is included within this range and used in combination with a metal pigment to be described later, a molded article exhibiting a metallic appearance and having excellent antistatic properties may be prepared by injecting the thermoplastic resin composition of the present invention.

Ethylene Copolymer

When the ethylene copolymer of the present invention is used in an appropriate amount in combination with the above-described second graft copolymer, surface defects, such as streaks, occurring when the above-described thermoplastic polyamide elastomer is used in combination with a metal pigment may be prevented, and injection appearance may be improved.

The ethylene copolymer may be a copolymer of i) ethylene; and ii) one or more ethylenically unsaturated monomers selected from $C_3$-$C_{10}$ alpha olefins, $C_1$-$C_{12}$ alkyl esters of unsaturated $C_3$-$C_{20}$ monocarboxylic acids, unsaturated $C_3$-$C_{20}$ mono or dicarboxylic acids, anhydrides of unsaturated $C_4$-$C_8$ dicarboxylic acids, and vinyl esters of saturated $C_2$-$C_{18}$ carboxylic acids, or an ionomer of the copolymer.

For example, the ethylene copolymer may include one or more selected from ethylene vinyl acetate copolymers, ethylene butyl acrylate copolymers, ethylene methyl acrylate copolymers, ethylene ethyl acrylate copolymers, ethylene methyl methacrylate copolymers, ethylene butene copolymers, and ethylene octene copolymers.

Based on 100% by weight in total of the ethylene copolymer, the ethylene copolymer may include vinyl acetate in an amount of 18 to 30% by weight, as a specific example, 21 to 30% by weight. Within this range, surface defects, such as streaks, occurring when the thermoplastic polyamide elastomer is used in combination with a metal pigment may be prevented, and injection appearance may be improved.

For example, based on 100 parts by weight of the base resin (the first graft copolymer+the second graft copolymer+the thermoplastic copolymer), the ethylene copolymer may be included in an amount of 1 to 6 parts by weight, preferably 1 to 5 parts by weight, more preferably 2 to 5 parts by weight. Within this range, a molded article having a metallic color appearance and excellent physical properties may be manufactured by injecting the thermoplastic resin composition of the present invention.

When the content of the above-described thermoplastic polyamide-based elastomer is "a", the content of the ethylene copolymer is "b", and the content of the above-described second graft copolymer is "c", when the value of "b+c" is more than 0.5 times of the value of "a", a molded article having desired effects, such as antistatic properties, appearance, injection quality, gloss, and processability, may be provided.

Metal Pigment

The metal pigment serves to form a metallic appearance.

For example, the metal pigment may be an aluminum pigment, a copper pigment, or a silver pigment, preferably an aluminum pigment.

The metal pigment may be directly prepared and used. Alternatively, a commercially available metal pigment may be used as the metal pigment.

For example, based on 100 parts by weight of the base resin, the metal pigment may be included in an amount of 0.05 to 5 parts by weight, preferably 0.1 to 5 parts by weight, more preferably 0.5 to 5 parts by weight, still more preferably 1 to 4 parts by weight. Within this range, a molded article exhibiting an excellent metallic appearance may be manufactured by injecting the thermoplastic resin composition of the present invention.

The metal pigment preferably has an average particle diameter of 1 to 50 μm, more preferably 5 to 40 μm, still more preferably 10 to 30 μm, still more preferably 15 to 25 μm. Within this range, an excellent metallic color and appearance may be secured.

In this description, the average particle diameter of the metal pigment may be measured according to a known method of measuring the size of particles. Specifically, the average particle diameter of the metal pigment may be measured using BET analysis equipment (Surface Area and Porosity Analyzer ASAP 2020, Micromeritics Co.) according to a nitrogen gas adsorption method.

Other Additives

Within a range that does not affect the quality of coating appearance and physical properties, the thermoplastic resin composition may include one or more additives selected from a lubricant, a light stabilizer, an antistatic agent, a release agent, an impact modifier, and a plasticizer.

For example, based on 100 parts by weight in total of the base resin, the additives may be included in an amount of 0.1 to 10 parts by weight, preferably 0.1 to 5 parts by weight. Within this range, the function of the additives may be effectively expressed without deterioration in the intrinsic properties of the thermoplastic resin composition of the present invention.

For example, the lubricant may include one or more selected from ethylene bis stearamide, oxidized polyethylene wax, magnesium stearate, calcium stearamide, and stearic acid, without being limited thereto.

For example, as the light stabilizer, HALS-based light stabilizers, benzophenone-based light stabilizers, benzotriazole-based light stabilizers, and the like may be used, without being limited thereto.

For example, as the antistatic agent, one or more selected from anionic surfactants and nonionic surfactants may be used, without being limited thereto.

For example, as the release agent, one or more selected from glycerin stearate and polyethylene tetrastearate may be used, without being limited thereto.

As a specific example, the additives may include 0.1 to 5 parts by weight of a lubricant and 0.1 to 1 part by weight of an antioxidant. Within this range, the intrinsic characteristics of the lubricant and the antioxidant may be expressed without affecting the physical properties of a thermoplastic resin composition.

Method of Preparing Thermoplastic Resin Composition

Hereinafter, a method of preparing the thermoplastic resin composition of the present invention will be described. In describing the method of preparing the thermoplastic resin composition of the present invention, all of the above-described thermoplastic resin composition is included.

For example, the method of preparing a thermoplastic resin composition of the present invention includes a step of melt-kneading and extruding a thermoplastic resin composition including a base resin including a first graft copolymer including a conjugated diene-based polymer, an aromatic vinyl-based monomer, and a vinyl cyanide-based monomer; a second graft copolymer including an acrylic rubber-based polymer, an aromatic vinyl-based monomer, and a vinyl cyanide-based monomer; and a thermoplastic copolymer including an aromatic vinyl-based monomer and a vinyl cyanide-based monomer, a thermoplastic polyamide elastomer, an ethylene copolymer, and a metal pigment.

In this case, when the weight of the thermoplastic polyamide elastomer based on 100 parts by weight of the base resin is "a", the weight of the ethylene copolymer based on 100 parts by weight of the base resin is "b", and the weight of the second graft copolymer based on 100% by weight in total of the base resin is "c", $b+c \geq 0.5a$ is satisfied.

As another example, the method of preparing the thermoplastic resin composition includes a step of feeding the first graft copolymer, the second graft copolymer, the thermoplastic copolymer, the thermoplastic polyamide elastomer, the ethylene copolymer, and the metal pigment into an extruder and performing melt-kneading at 210 to 240° C.

For example, in the melt-kneading step, the above-described additives may be added.

For example, the melt-kneading and extrusion step may be performed using one or more selected from a single-screw extruder, a twin-screw extruder, and a Banbury mixer. Preferably, the melt-kneading and extrusion step may be performed by uniformly mixing components using a twin-screw extruder and performing extrusion to obtain a thermoplastic resin composition in a pellet form. In this case, mechanical properties, thermal properties, plating adhesion, and appearance may be excellent.

As another example, the method of preparing the thermoplastic resin composition may include a step of mixing the first graft copolymer, the second graft copolymer, the thermoplastic copolymer, the thermoplastic polyamide elastomer, the ethylene copolymer, and the metal pigment; uniformly dispersing the mixture using a single-screw extruder, a twin-screw extruder, or a Banbury mixer; performing extrusion; passing an extrudate through a water bath; and cutting the extrudate to obtain pellets.

For example, the step of preparing pellets using an extrusion kneader may be performed at 210 to 240° C. and 150 to 250 rpm, as a specific example, 220 to 235° C. and 170 to 230 rpm. In this case, the temperature means temperature set in a cylinder.

For example, using the thermoplastic resin composition pellets, an injection-molded article may be manufactured at an injection barrel temperature of 210 to 250° C., preferably 220 to 240° C., using an injection machine.

In addition, a molded article including the thermoplastic resin composition of the present invention will be described. In describing the molded article including the thermoplastic resin composition of the present invention, all of the above-described thermoplastic resin composition is included.

Molded Article

For example, the molded article of the present invention may be manufactured using the thermoplastic resin composition of the present invention. In this case, a molded article having excellent mechanical properties, antistatic properties injection quality, and appearance and exhibiting a metallic color may be provided.

For example, the molded article of the present invention may have a surface resistance of $1 \times 10^{12}$ Ω/sq or less as measured according to IEC 60093.

For example, the molded article of the present invention may have a gloss (45°) of 100 or more, as a specific example, 100 to 102, as measured according to ASTM E97.

The use of the molded article is not particularly limited, but is preferably a housing for electronic products and home appliances. In this case, by imparting antistatic properties to a product, processing problems and dust adsorption caused by static electricity may be solved. In addition, due to excellent surface quality, the processing yield of a product may be increased.

In describing the thermoplastic resin composition of the present invention, the method of preparing the same, and the molded article including the same, other conditions or equipment that are not explicitly described may be appropriately selected without particular limitation within the range commonly practiced in the art.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 5, Comparative Examples 1 to 7, and Reference Examples 1 to 3 below are as follows.
- A) First graft copolymer (ABS): 60% by weight of a butadiene polymer having an average particle diameter of 300 nm, 30% by weight of styrene, and 10% by weight of acrylonitrile
- B) Second graft copolymer (ASA): 50% by weight of a butyl acrylate polymer having an average particle diameter of 300 nm, 35% by weight of styrene, and 15% by weight of acrylonitrile
- C-1) Thermoplastic copolymer (bulk polymerized SAN): 70% by weight of styrene and 30% by weight of acrylonitrile, Mw: 120,000 g/mol
- C-2) Thermoplastic copolymer (bulk polymerized SAN): 68% by weight of styrene and 32% by weight of acrylonitrile, Mw: 150,000 g/mol
- D-1) Thermoplastic polyamide elastomer (poly(ether-block-amide) copolymer): melting point: 200° C., density: 1.14, surface resistance measured according to IEC 60093: $1 \times 10^{7}$ Ω/sq
- D-2) Thermoplastic polyamide elastomer (poly(ether ester-block-amide) copolymer): melting point: 202° C., surface resistance measured according to IEC 60093: $1 \times 10^{9}$ Ω/sq
- E-1) Ethylene copolymer: 28% by weight of vinyl acetate and 72% by weight of ethylene
- E-2) Ethylene copolymer: 15% by weight of vinyl acetate and 85% by weight of ethylene
- E-3) Ethylene copolymer: 35% by weight of vinyl acetate and 65% by weight of ethylene
- F-1) Metal pigment (aluminum pigment, Silverline Co., average particle diameter: 20 μm)
- F-2) Non-metallic inorganic pigment (product name: BAYFERROX 120, manufacturer: Lanxess)

Examples 1 to 5, Comparative Examples 1 to 7, and Reference Examples 1 to 3

According to the contents shown in Tables 1 to 3 below, the components were introduced into a twin-screw extruder set to 230° C. and melt-kneaded and extruded to obtain pellets. Using the pellets, melt index was measured.

A specimen for measuring physical properties having a size of 100 mm×100 mm×3.2 mm was prepared by injecting the pellets at a molding temperature of 230° C., and the surface resistance, injection appearance (surface flow characteristics), and injection gloss of the specimen were measured.

Test Examples

The physical properties of the pellets and the specimens prepared in Examples 1 to 5, Comparative Examples 1 to 7, and Reference Examples 1 to 3 were measured according to the following methods, and the results are shown in Tables 1 to 3 below.

Melt index (MI, g/10 min): The melt index of the prepared pellets was measured using melt index measuring equipment (DYNISCO Co.) under conditions of a temperature of 220° C., a weight of 10 kg, and a reference time of 10 minutes according to ASTM D1238.

Surface resistance (Ω/sq): The surface resistance of an injection specimen having a size of 100 mm×100 mm was measured using a surface resistance measuring device having two types of probes according to IEC 60093.

Injection appearance (evaluation of flow marks and appearance dots): Conditions for reducing flow marks and appearance dots observed along the wall of a molded article, centering on a gate on the surface of the molded article, were evaluated based on the following three criteria. That is, no streaks and appearance dots were observed when injection temperature was adjusted within 10° C. and injection rate was adjusted to less than 30%, which was marked as "○". Some streaks and appearance dots were observed when injection temperature was adjusted to 10 to 30 ° C. and injection rate was adjusted to 30 to 70%, which was marked as "Δ". Many or clear streaks and appearance dots were observed even when injection temperature was adjusted to more than 30° C. and injection rate was adjusted to 70% or more, which was marked as "X".

Injection gloss: The gloss of a specimen having a thickness of ⅛ inch (3.2 mm) was measured at 45° using a gloss meter VG7000 according to ASTM E97.

TABLE 1

| Classification | Example 1 | Example 2 | Example 3 | Example 4 | Example 5 |
|---|---|---|---|---|---|
| A | 22 | 21 | 22 | 20 | 22 |
| B (content: c) | 5 | 7 | 6 | 8 | 5 |
| C-1 | 73 | 72 | 72 | 72 | 30 |
| C-2 | — | — | — | — | 43 |
| D-1 (content: a) | 7 | 10 | — | — | 10 |
| D-2 (content: a) | — | — | 10 | 12 | — |
| E-1 (content: b) | 2 | 3 | 3 | 5 | 2 |
| E-2 (content: b) | — | — | — | — | — |
| E-3 (content: b) | — | — | — | — | — |
| F-1 | 2 | 2 | 2 | 2 | 2 |
| F-2 | — | — | — | — | — |
| b + c/0.5a | 7/3.5 | 10/5 | 9/5 | 13/6 | 7/5 |
| Melt index | 24.0 | 23.5 | 21.3 | 23.6 | 22.1 |
| Surface resistance | <10^12 | <10^12 | <10^12 | <10^12 | <10^12 |
| Injection appearance | ○ | ○ | ○ | ○ | ○ |
| Injection gloss | 101 | 102 | 102 | 101 | 102 |

(The contents of D-1, D-2, E-1, E-2, E-3, F-1, and F-2 are given in parts by weight based on 100 parts by weight in total of A, B, C-1, and C-2)

TABLE 2

| Classification | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| A | 22 | 21 | 26 | 22 | 22 | 22 | 22 |
| B (content: c) | 5 | 5 | — | 5 | 5 | 5 | 5 |
| C-1 | 73 | 74 | 74 | 73 | 73 | 73 | 73 |
| C-2 | — | — | — | — | — | — | — |
| D-1 (content: a) | — | 7 | 7 | 3 | 3 | 3 | 25 |
| D-2 (content: a) | — | — | — | — | — | — | — |
| E-1 (content: b) | 2 | — | 3 | 2 | — | — | 2 |
| E-2 (content: b) | — | — | — | — | 2 | — | — |
| E-3 (content: b) | — | — | — | — | — | 2 | — |
| F-1 | 2 | 2 | 2 | 2 | 2 | 2 | 2 |
| F-2 | 0.1 | 0.1 | — | — | — | — | — |
| b + c/0.5a | 7/0 | 0/3.5 | 3/3.5 | 7/1.5 | 7/3.5 | 7/3.5 | 7/12.5 |
| Melt index | 23.0 | 23.2 | 23.5 | 22.9 | 22.0 | 25.0 | NA |

TABLE 2-continued

| Classification | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Surface resistance | <10^13 | <10^12 | <10^12 | <10^13 | <10^12 | <10^12 | NA |
| Injection appearance | ○ | X | Δ | ○ | X | Δ | NA |
| Injection gloss | 102 | 101 | 100 | 101 | 101 | 85 | NA |

(The contents of D-1, D-2, E-1, E-2, E-3, F-1, and F-2 are given in parts by weight based on 100 parts by weight in total of A, B, C-1, and C-2.)

TABLE 3

| Classification | Reference Example 1 | Reference Example 2 | Reference Example 3 |
|---|---|---|---|
| A | 26 | 18 | 22 |
| B (content: c) | 2 | 9 | 5 |
| C-1 | 72 | 73 | 73 |
| C-2 | — | — | — |
| D-1 (content: a) | 5 | 3 | 7 |
| D-2 (content: a) | — | — | — |
| E-1 (content: b) | 2 | 2 | 2 |
| E-2 (content: b) | — | — | — |
| E-3 (content: b) | — | — | — |
| F-1 | 2 | 2 | — |
| F-2 | — | — | 0.2 |
| b + c/0.5a | 7/5 | 11/1.5 | 7/3.5 |
| Melt index | 21.0 | 26.0 | 24.0 |
| Surface resistance | <10^13 | <10^12 | <10^12 |
| Injection appearance | Δ | ○ | ○ |
| Injection gloss | 100 | 95 | 100 |

(The contents of D-1, D-2, E-1, E-2, E-3, F-1, and F-2 are given in parts by weight based on 100 parts by weight in total of A, B, C-1, and C-2.)

As shown in Tables 1 to 3, in the case of Examples 1 to 5 according to the present invention, since the first graft copolymer, the second graft copolymer, the thermoplastic copolymer, the thermoplastic polyamide elastomer, the ethylene copolymer, and the metal pigment are included in an optimal composition ratio, surface resistance and injection appearance are excellent while maintaining melt index and injection gloss equal or superior to those of Comparative Examples 1 to 7 and Reference Examples 1 to 3 outside the composition of the present invention.

In addition, in the case of Comparative Example 1 not including the thermoplastic polyamide elastomer, surface resistance is significantly lower than the level required in the present invention. In the case of Comparative Example 4 including a small amount of the thermoplastic polyamide elastomer, surface resistance is significantly lower than the level required in the present invention. In the case of Comparative Example 7 including an excess of the thermoplastic polyamide elastomer, due to aggregation between a metal pigment and a resin, processing defects became severe and workability deteriorated, making it impossible to measure physical properties.

In addition, in the case of Comparative Examples 2 and 3 in which the sum ratio of the ethylene copolymer and the second graft copolymer is small, injection appearance is poor.

In addition, in the case of Comparative Examples 5 and 6 in which the content of vinyl acetate constituting the ethylene copolymer is not appropriate, injection appearance and surface quality are not good.

In addition, in the case of Reference Example 1 in which the weight ratio of the first graft copolymer to the second graft copolymer is greater than 3:1, gloss is poor. In the case of Reference Example 2 in which the weight ratio of the first graft copolymer to the second graft copolymer is 1:0.5, due to deterioration in the dispersibility of a metal pigment, the appearance of an injection product is deteriorated.

In addition, in the case of Reference Example 3 in which a non-metal inorganic pigment is used instead of a metal pigment, physical properties and injection appearance are secured, but surface quality provided by the metallic pigment is not implemented.

Figure 1:
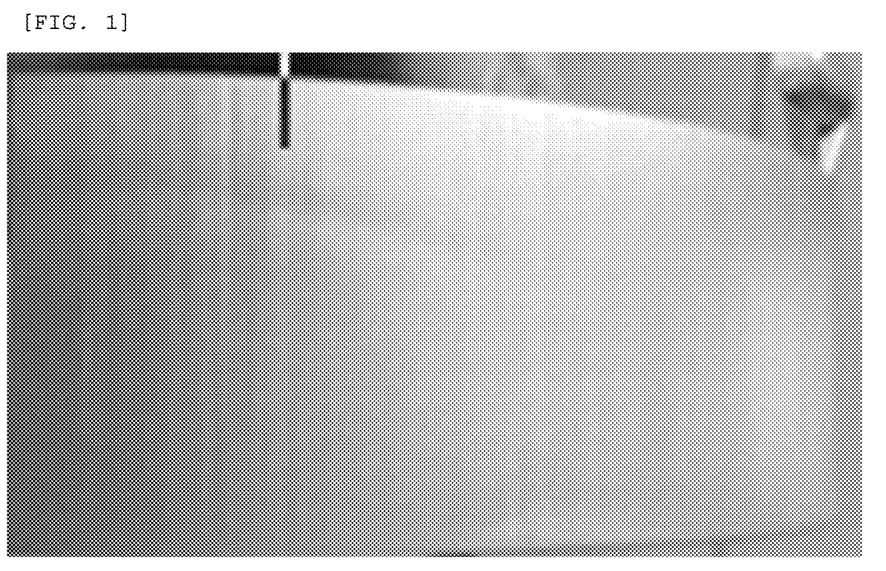
FIG. 1 is an image showing streaks generated by pearl aggregation on the surface of a molded article according to Comparative Example 2 to be described later.
Figure 2:
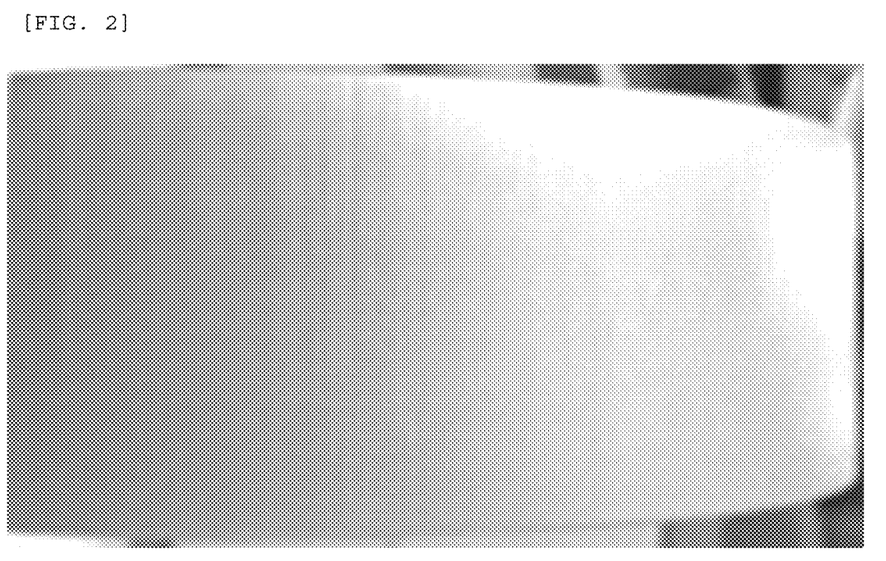
FIG. 2 is an image showing that there are no streaks on the surface of a molded article according to Example 1 to be described later due to the effect of preventing pearl aggregation.

In addition, referring to FIGS. 1 and 2, in the case of Comparative Example 2 outside the range of the present invention, defects in injection appearance such as streaks due to aggregation of a metal pigment can be confirmed by visual observation. In the case of Example 1 according to the present invention, no streaks are observed, indicating that aggregation of a metal pigment is prevented.

In conclusion, according to the present invention, by introducing a metal pigment including an antistatic agent to an ABS-based resin, surface defects that may occur during product molding may be prevented. In addition, by introducing a graft copolymer including an acrylate-based polymer and an ethylene copolymer to the ABS-based resin in an appropriate mixing ratio, compatibility between the ABS-based resin and the metal pigment and compatibility between the ABS-based resin and a thermoplastic polyamide elastomer as an antistatic agent may be increased while maintaining the excellent processability, moldability, impact resistance, strength, and gloss of the ABS-based resin. Thus, aggregation of the metal pigment may be prevented, and surface defects may be dramatically reduced. In addition, a metallic color material having excellent antistatic properties, injection appearance, injection gloss, and processability may be provided, and a molded article having excellent properties may be manufactured using the metallic color material.

The invention claimed is:
1. A thermoplastic resin composition, comprising:
   a base resin comprising a first graft copolymer comprising a conjugated diene-based polymer, an aromatic vinyl-based monomer, and a vinyl cyanide-based monomer; a second graft copolymer comprising an acrylic rubber-based polymer, an aromatic vinyl-based monomer, and a vinyl cyanide-based monomer; and a thermoplastic copolymer comprising an aromatic vinyl-based monomer and a vinyl cyanide-based monomer,
   a thermoplastic polyamide elastomer,
   an ethylene copolymer, and
   a metal pigment,
   wherein, when a weight of the thermoplastic polyamide elastomer based on 100 parts by weight of the base resin is "a", a weight of the ethylene copolymer based on 100 parts by weight of the base resin is "b", and a weight of the second graft copolymer based on 100% by weight in total of the base resin is "c", b+c≥0.5a is satisfied.

2. The thermoplastic resin composition according to claim 1, wherein a weight ratio of the first graft copolymer to the second graft copolymer is 3:1 to 5:1.

3. The thermoplastic resin composition according to claim 1, wherein the base resin comprises 15 to 40% by weight of the first graft copolymer; 3 to 17% by weight of the second graft copolymer; and 55 to 80% by weight of the thermoplastic copolymer.

4. The thermoplastic resin composition according to claim 1, wherein the ethylene copolymer comprises one or more selected from an ethylene vinyl acetate copolymer, an ethylene butyl acrylate copolymer, an ethylene methyl acrylate copolymer, an ethylene ethyl acrylate copolymer, an ethylene methyl methacrylate copolymer, an ethylene butene copolymer, and an ethylene octene copolymer.

5. The thermoplastic resin composition according to claim 1, wherein, the thermoplastic resin composition comprises the ethylene copolymer in an amount of 1 to 6 parts by weight, based on 100 parts by weight of the base resin.

6. The thermoplastic resin composition according to claim 1, wherein the ethylene copolymer comprises 18 to 30% by weight of vinyl acetate.

7. The thermoplastic resin composition according to claim 1, wherein the thermoplastic polyamide elastomer has a surface resistance of $1\times10^7$ to $1\times10^9$ Ω/sq as measured according to IEC 60093.

8. The thermoplastic resin composition according to claim 1, wherein, the thermoplastic polyamide elastomer comprises 5 to 20 parts by weight of one or more selected from a poly(ether-block-amide) copolymer and a poly(ether ester-block-amide) copolymer, based on 100 parts by weight of the base resin.

9. The thermoplastic resin composition according to claim 1, wherein the metal pigment comprises 0.05 to 5 parts by weight of one or more selected from an aluminum pigment, a copper pigment, and a silver pigment, based on 100 parts by weight of the base resin.

10. The thermoplastic resin composition according to claim 1, wherein, in the first graft copolymer, the conjugated diene-based rubber has an average particle diameter of 0.01 to 1 pm, and comprises a shell having a weight average molecular weight of 70,000 to 300,000 g/mol.

11. The thermoplastic resin composition according to claim 1, wherein, the first graft copolymer comprises 40 to 80% by weight of the conjugated diene-based polymer, 10 to 45% by weight of the aromatic vinyl-based monomer, and 1 to 25% by weight of the vinyl cyanide-based monomer, based on 100% by weight in total of the first graft copolymer.

12. The thermoplastic resin composition according to claim 1, wherein, in the second graft copolymer, the acrylic rubber has an average particle diameter of 0.01 to 1 μm, and comprises a shell having a weight average molecular weight of 70,000 to 300,000 g/mol.

13. The thermoplastic resin composition according to claim 1, wherein, the second graft copolymer comprises 40 to 70% by weight of the acrylic rubber-based polymer, 10 to 45% by weight of the aromatic vinyl-based monomer, and 1 to 25% by weight of the vinyl cyanide-based monomer, based on 100% by weight in total of the second graft copolymer.

14. The thermoplastic resin composition according to claim 1, wherein the acrylic rubber-based polymer comprises one or more selected from a butyl (meth)acrylate polymer, a 2-ethylhexyl (meth)acrylate polymer, and a hexyl acrylate polymer.

15. The thermoplastic resin composition according to claim 1, wherein, the thermoplastic copolymer comprises 50 to 90% by weight of the aromatic vinyl-based monomer and 10 to 50% by weight of the vinyl cyanide-based monomer, based on 100% by weight in total of the thermoplastic copolymer.

16. The thermoplastic resin composition according to claim 1, wherein the thermoplastic copolymer comprises two or more types of thermoplastic copolymers having different vinyl cyanide-based monomer contents.

17. The thermoplastic resin composition according to claim 1, wherein the thermoplastic resin composition is a permanent antistatic thermoplastic resin composition.

18. A method of preparing a thermoplastic resin composition, comprising:
melt-kneading and extruding a thermoplastic resin composition comprising a base resin comprising a first graft copolymer comprising a conjugated diene-based polymer, an aromatic vinyl-based monomer, and a vinyl cyanide-based monomer; a second graft copolymer comprising an acrylic rubber-based polymer, an aromatic vinyl-based monomer, and a vinyl cyanide-based monomer; and a thermoplastic copolymer comprising an aromatic vinyl-based monomer and a vinyl cyanide-based monomer, a thermoplastic polyamide elastomer, an ethylene copolymer, and a metal pigment,
wherein, when a weight of the thermoplastic polyamide elastomer based on 100 parts by weight of the base resin is "a", a weight of the ethylene copolymer based on 100 parts by weight of the base resin is "b", and a weight of the second graft copolymer based on 100% by weight in total of the base resin is "c", b+c≥0.5a is satisfied.

19. A molded article manufactured using the thermoplastic resin composition according to claim 1.

20. The molded article according to claim 19, wherein the molded article has a surface resistance of $1\times10^{12}$ Ω/sq or less as measured according to IEC 60093 and a gloss (45°) of 100 or more as measured according to ASTM E97.

* * * * *